United States Patent [19]

Hasegawa et al.

[11] Patent Number: 5,817,590
[45] Date of Patent: *Oct. 6, 1998

[54] CATALYST FOR αE —OLEFIN POLYMERIZATION CONTAINING A LEWIS BASE

[75] Inventors: Saiki Hasegawa; Hisami Yasuda; Akihiro Yano, all of Mie-ken, Japan

[73] Assignee: Tosoh Corporation, Shinnanyo, Japan

[*] Notice: The term of this patent shall not extend beyond the expiration date of Pat. No. 5,576,259.

[21] Appl. No.: 619,884

[22] Filed: Mar. 20, 1996

Related U.S. Application Data

[63] Continuation-in-part of Ser. No. 319,035, Oct. 6, 1994, Pat. No. 5,576,259.

[30] Foreign Application Priority Data

Oct. 14, 1993 [JP] Japan ................................ 5-257072

[51] Int. Cl.⁶ .............................. B01J 31/00; B01J 37/00; C08F 4/02; C08F 4/60
[52] U.S. Cl. ........................ 502/118; 502/121; 502/122; 502/123; 502/124; 502/125; 502/126; 502/127; 502/132; 526/160; 526/943
[58] Field of Search ..................................... 502/118, 121, 502/122, 123, 124, 125, 126, 127, 132

[56] References Cited

U.S. PATENT DOCUMENTS

| | | | |
|---|---|---|---|
| 5,250,629 | 10/1993 | Tani et al. | 526/347 |
| 5,329,033 | 7/1994 | Spaleck et al. | 502/117 |
| 5,387,568 | 2/1995 | Ewen et al. | 502/118 |
| 5,395,810 | 3/1995 | Shamshoum et al. | 502/125 |
| 5,434,115 | 7/1995 | Yamada et al. | 502/103 |
| 5,455,365 | 10/1995 | Winter et al. | 502/117 |
| 5,693,836 | 12/1997 | Winter et al. | 556/11 |

FOREIGN PATENT DOCUMENTS

| | | |
|---|---|---|
| 0 513 380 | 11/1992 | European Pat. Off. . |
| 0 582 268 | 2/1994 | European Pat. Off. . |

*Primary Examiner*—Mark L. Bell
*Assistant Examiner*—J. Pasterczyk
*Attorney, Agent, or Firm*—Oblon, Spivak, McClelland, Maier & Neustadt, P.C.

[57] ABSTRACT

A catalyst for olefin polymerization is provided which comprises, as the components, a) a metallocene compound, b) an ionizing ionic compound, c) an organoaluminum compound, and d) a Lewis base compound. This catalyst has a stable active species and improves productivity of an olefin polymer without deterioration of the catalytic activity the metallocene is represented by General Formula (1) or (2) where Cp-containing ligands may be Cp, fluorenyl, indenyl or tetrahydroindenyl and where the metal is a group 4 metal of the periodic table.

1 Claim, No Drawings

CATALYST FOR αE — OLEFIN POLYMERIZATION CONTAINING A LEWIS BASE

CROSS REFERENCE TO RELATED APPLICATIONS

This application is a continuation-in-part of copending application Ser. No. 08/319,035, filed on Oct. 6, 1994, now U.S. Pat. No. 5,576,259.

BACKGROUND OF THE INVENTION

1. Field of the Invention:

The present invention relates to a catalyst for producing an α-olefin comprising a metallocene, an organoaluminum compound, an ionizing ionic compound, and a Lewis base compound. The present invention also relates to a process for producing an α-olefin polymer employing the above catalyst.

2. Description of the Relate Art:

For polymerization of olefins, special active catalysts are known which comprise combination of a cyclopentadienyl derivative of a metal such as titanium, zirconium, and hafnium (Group 4B of Periodic Table) with aluminoxane.

This type of catalyst is not used practically in commercial production of olefin polymers mainly because of the following disadvantages: the aluminoxane cannot readily be synthesized with high reproducibility, and therefore preparation of the catalyst and production of the polymers cannot be conducted with sufficient reproducibility; and aluminoxane is required to be used in a high ratio to the transition metal compound to achieve sufficient catalyst activity although the raw material of aluminoxane, e.g., trimethylaluminum, is expensive.

To offset the disadvantages, ionic metallocene catalysts are reported. JP-A-3-207704 discloses an ionic metallocene compound prepared by reacting a metallocene compound with an ionizing ionic compound. W092/01723 discloses an α-olefin polymerization process employing a catalyst system prepared by reacting a halogenated metallocene compound with an organometallic compound and further bringing the product into contact with an ionizing ionic compound, the catalyst system having sufficient catalytic activity.

The catalyst system employing an ionizing ionic compound, which has a high initial activity, loses its activity with progress of polymerization, disadvantageously.

After comprehensive study to solve the above problems, the inventors of the present invention have found that a catalyst prepared by reacting an ionic metallocene catalyst with a Lewis base compound has a stable catalytic species, and exhibits improved productivity of polymers without deterioration of the catalytic activity.

3. Summary of the Invention:

The present invention intends to improve productivity of polymers by stabilizing the active species of the catalyst to prevent deterioration of the catalyst activity without the above disadvantages of the prior art.

The present invention provides a catalyst for polymerization of olefin, comprising a) a metallocene compound, b) an ionizing ionic compound, c) an organoaluminum compound, and d) a Lewis base compound:

a) the metallocene compound being represented by General Formula (1) or (2):

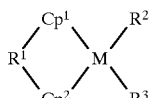  (1)

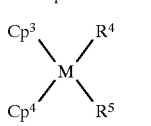  (2)

where $Cp^1$, $Cp^2$, $Cp^3$ and $Cp^4$ are independently a substituted or unsubstituted cyclopentadienyl, indenyl, or fluorenyl group; $R^1$ is a substituted or unsubstituted alkylene, dialkylsilanediyl, dialkylgermanediyl, alkylphosphinediyl, or alkylimino group, and $R^1$ links $Cp^1$ with $Cp^2$ by bridging; M is a titanium atom, a zirconium atom, or a hafnium atom; and $R^2$, $R^3$, $R^4$ and $R^5$ are independently a hydrogen atom, a halogen atom, a hydrocarbon group of 1 to 12 carbon atoms, an alkoxy group of 1 to 12 carbon atoms, or aryloxy group;

b) the ionizing ionic compound being a compound which is capable of changing the above metallocene compound (a) into a cationic metallocene compound and does not react further the formed cationic metallocene compound;

c) the organoaluminum compound being represented by General Formula (3):

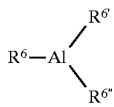  (3)

where $R^6$, $R^{6'}$ and $R^{6''}$ are independently a hydrogen atom, a halogen atom, an amino group, an alkyl group, an alkoxy group, or an aryl group, and at least one of $R^6$, $R^{6'}$, and $R^{6''}$ is an alkyl group; the preferred amount of Lewis base compound is 0.1 to 1,000 moles per mole of the metallocene compound. Thus, 1) in the case where a Lewis base is freed from the ionizing compound, the freed Lewis base plus the Lewis base compound added is: 1+0.1 to 1,000 or 1.1 to 1,000 moles;

2) in the case where a Lewis base compound is not freed from the ionizing compound, the freed Lewis base compound plus the Lewis base compound added later is: 0+1.1+1,000 or 1.1 to 1,000 moles.

d) the Lewis base compound being capable of donating an electron to the formed cationic metallocene compound.

The present invention also provides a process for producing an α-olefin polymer by polymerizing α-olefin in the presence of the above catalyst.

DETAILED DESCRIPTION OF THE INVENTION

The metallocene compound (a) employed in the present invention is represented by General Formula (1) or (2)

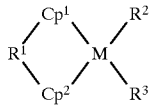  (1)

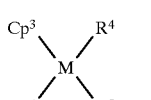  (2)

where $Cp^1$, $Cp^2$ are independently a hydrocarbon group represented by General Formula (4), (5), (6), or (7) below;

Cp³ and Cp⁴ are independently a hydrocarbon group represented by General Formula (8), (9), (10), or (11) below; $R^1$ is a substituted or unsubstituted alkylene, dialkylsilanediyl, dialkylgermandiyl, alkylphosphinediyl, or alkylimino group, and $R^1$ links $Cp^1$ with $Cp^2$ by bridging; M is a titanium, zirconium, or hafnium atom; and $R^2$, $R^3$, $R^4$, and $R^5$ are independently a hydrogen atom, a halogen atom, a hydrocarbon group, an alkoxy group or an aryloxy group of 1 to 12 carbon atoms,

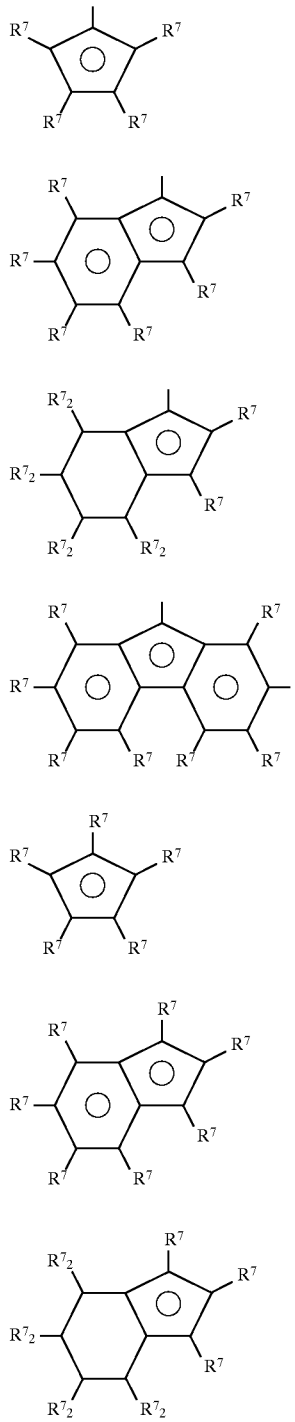

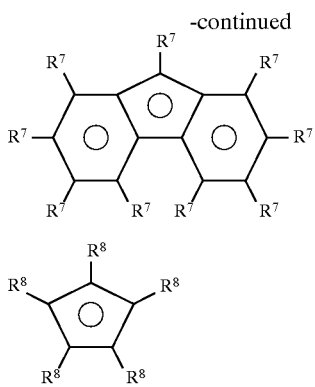

where each $R^7$ is independently a hydrogen atom, a halogen atom, a hydrocarbon, an alkoxy, or an aryloxy group of 1 to 12 carbon atoms, and where each $R^8$ is independently a halogen atom, a hydrocarbon, an alkoxy, or an aryloxy group of 1 to 20 carbons. The specific examples thereof include:

bis(cyclopentadienyl)titanium dichloride,
bis(cyclopentadienyl)zirconium dichloride,
bis(cyclopentadienyl)hafnium dichloride,
bis(methylcyclopentadienyl)titanium dichloride,
bis(methylcyclopentadienyl)zirconium dichloride,
bis(methylcyclopentadienyl)hafnium dichloride,
bis(butylcyclopentadienyl)titanium dichloride,
bis(butylcyclopentadienyl)zirconium dichloride,
bis(butylcyclopentadienyl)hafnium dichloride,
ethylenebis(indenyl)titanium dichloride,
ethylenebis(indenyl)zirconium dichloride,
ethylenebis(indenyl)hafnium dichloride,
dimethylsilanediylbis(2,4,5-trimethylcyclopentadienyl)-titanium dichloride,
dimethylsilanediylbis(2,4,5-trimethylcyclopentadienyl)-zirconium dichloride,
dimethylsilanediylbis(2,4,5-trimethylcyclopentadienyl)-hafnium dichloride,
dimethylsilanediylbis(2,4-dimethylcyclopentadienyl)-titanium dichloride,
dimethylsilanediylbis(2,4-dimethylcyclopentadienyl)-zirconium dichloride,
dimethylsilanediylbis(2,4-dimethylcyclopentadienyl)-hafnium dichloride,
dimethylsilanediylbis(3-methylcyclopentadienyl)titanium dichloride,
dimethylsilanediylbis(3-methylcyclopentadienyl)zirconium dichloride,
dimethylsilanediylbis(3-methylcyclopentadienyl)hafnium dichloride,
dimethylsilanediylbis(4-t-butyl-2methylcyclopentadienyl) titanium dichloride,
dimethylsilanediylbis(4-t-butyl-2-methylcyclopentadienyl) zirconium dichloride,
dimethylsilanediylbis(4-t-butyl-2-methylcyclopentadienyl) hafnium dichloride,
diethylsilanediylbis(2,4,5-trimethylcyclopentadienyl)-titanium dichloride,
diethylsilanediylbis(2,4,5-trimethylcyclopentadienyl)-zirconium dichloride,
diethylsilanediylbis(2,4,5-trimethylcyclopentadienyl)-hafnium dichloride,
diethylsilanediylbis(2,4-dimethylcyclopentadienyl)-titanium dichloride,
diethylsilanediylbis(2,4-dimethylcyclopentadienyl)-zirconium dichloride, diethylsilanediylbis(2,4-dimethylcyclopentadienyl)-
hafnium dichloride,
diethylsilanediylbis(3-methylcyclopentadienyl)titanium
dichloride,
diethylsilanediylbis(3-methylcyclopentadienyl)zirconium
dichloride,
diethylsilanediylbis(3-methylcyclopentadienyl)hafnium
dichloride,
diethylsilanediylbis(4-t-butyl-2-methylcyclopentadienyl)-
titanium dichloride,
diethylsilanediylbis(4-t-butyl-2-methylcyclopentadienyl)-
zirconium dichloride,
diethylsilanediylbis(4-t-butyl-2-methylcyclopentadienyl)-
hafnium dichloride,
isopropylidene(cyclopentadienyl)(fluorenyl)titanium
dichloride,
isopropylidene(cyclopentadienyl)(fluorenyl)zirconium
dichloride,
isopropylidene(cyclopentadienyl)(fluorenyl)hafnium
dichloride,
diphenylmethylene(cyclopentadienyl)(fluorenyl)titanium
dichloride,
diphenylmethylene(cyclopentadienyl)(fluorenyl)zirconium
dichloride,
diphenylmethylene(cyclopentadienyl)(fluorenyl)hafnium
dichloride,
methylphenylmethylene(cyclopentadienyl)(fluorenyl)
titanium dichloride,
methylphenylmethylene(cyclopentadienyl)(fluorenyl)
zirconium dichloride,
methylphenylmethylene(cyclopentadienyl)(fluorenyl)
hafnium dichloride,
isopropylidene(cyclopentadienyl)(2,7-di-t-butylfluorenyl)-
titanium dichloride,
isopropylidene(cyclopentadienyl)(2,7-di-t-butylfluorenyl)-
zirconium dichloride,
isopropylidene(cyclopentadienyl)(2,7-di-t-butylfluorenyl)-
hafnium dichloride,
diphenylmethylene(cyclopentadienyl)(2,7-di-t-
butylfluorenyl) titanium dichloride,
diphenylmethylene(cyclopentadienyl)(2,7-di-t-
butylfluorenyl) zirconium dichloride,
diphenylmethylene(cyclopentadienyl)(2,7-di-t-
butylfluorenyl) hafnium dichloride,
methylphenylmethylene(cyclopentadienyl)(2,7-di-t-
butylfluorenyl) titanium dichloride,
methylphenylmethylene(cyclopentadienyl)(2,7-di-t-
butylfluorenyl) zirconium dichloride,
methylphenylmethylene(cyclopentadienyl)(2,7-di-t-
butylfluorenyl) hafnium dichloride,
isopropylidenebis(cyclopentadienyl)titanium dichloride,
isopropylidenebis(cyclopentadienyl)zirconium dichloride,
isopropylidenebis(cyclopentadienyl)hafnium dichloride,
diphenylmethylenebis(cyclopentadienyl)titanium
dichloride,
diphenylmethylenebis(cyclopentadienyl)zirconium
dichloride,
diphenylmethylenebis(cyclopentadienyl)hafnium
dichloride,
methylphenylmethylenebis(cyclopentadienyl)titanium
dichloride,
methylphenylmethylenebis(cyclopentadienyl)zirconium
dichloride,
methylphenylmethylenebis(cyclopentadienyl)hafnium
dichloride,
isopropylidene(cyclopentadienyl)(tetramethylcyclopenta-
dienyl) titanium dichloride,
isopropylidene(cyclopentadienyl)(tetramethylcyclopenta-
dienyl) zirconium didhloride,
isopropylidene(cyclopentadienyl)(tetramethylcyclopenta-
dienyl) hafnium dichloride,
diphenylmethylene(cyclopentadienyl)
(tetramethylcyclopenta-dienyl) titanium dichloride,
diphenylmethylene(cyclopentadienyl)
(tetramethylcyclopenta-dienyl) zirconium dichloride,
diphenylmethylene(cyclopentadienyl)
(tetramethylcyclopenta-dienyl) hafnium dichloride,
ispropylidenebis(indenyl)titanium dichloride,
ispropylidenebis(indenyl)zirconium dichloride,
ispropylidenebis(indenyl)hafnium dichloride,
diphenylmethylenebis(indenyl)titanium dichloride,
diphenylmethylenebis(indenyl)zirconium dichloride,
diphenylmethylenebis(indenyl)hafnium dichloride,
methylphenylmethylenebis(indenyl)titanium dichloride,
methylphenylmethylenebis(indenyl)zirconium dichloride,
methylphenylmethylenebis(indenyl)hafnium dichloride,
ethylene bis(tetrahydroindenyl) titanium dichloride
ethylene bis(tetrahydroindenyl) zirconium dichloride
ethylene bis(tetrahydroindenyl) hafnium dichloride
dimethylsilanediyl bis (indenyl) titanium dichloride
dimethylsilanediyl bis (indenyl) zirconium dichloride
dimethylsilanediyl bis (indenyl) hafnium dichloride
dimethylsilanediyl bis(2-methyl-indenyl) titanium dichlo-
ride
dimethylsilanediyl bis(2-methyl-indenyl) zirconium dichlo-
ride
dimethylsilanediyl bis(2-methyl-indenyl) hafnium dichlo-
ride
bis(indenyl) titanium dichloride
bis(indenyl) zirconium dichloride
bis(indenyl) hafnium dichloride
bis(cyclopentadienyl) titanium dichloride
bis(cyclopentadienyl) zirconium dichloride
bis(cyclopentadienyl) hafnium dichloride
further examples of metallocene compound (a) include:
bis(indenyl)zirconium dichloride,
bis(2-methylindenyl)zirconium dichloride,
bis(2-butylindenyl)zirconium dichloride,
bis(2-methoxyindenyl)zirconium dichloride,
bis(2-phenoxyindenyl)zirconium dichloride,
bis(2-fluoroindenyl)zirconium dichloride,
ethylenebis(tetrahydroindenyl)zirconium dichloride,
dimethylsilanediylbis(indenyl)zirconium dichloride,
dimethylsilanediylbis (tetrahydroindenyl) zirconium
dichloride,
dimethylsilanediylbis(fluorenyl)zirconium dichloride,
dimethylsilanediylbis(2-methylindenyl)zirconiundichloride,
and the like, but the metallocene compounds are not
limited thereto.

The ionizing ionic component includes compound (b) where $Cp^1$ and $Cp^2$ are independently a hydrocarbon group represented by General Formula (4), (5), (6), or (7) below; $Cp^3$ and $Cp^4$ are independently a hydrocarbon group represented by General Formula (8), (9), (10), or (11) below; $R^1$ is a substituted or unsubstituted alkylene, dialkylsilanediyl, dialkylgermandiyl, alkylphosphinediyl, or alkylimino group, and $R^1$ links $Cp^1$ with $Cp^2$ by bridging; M is a titanium, zirconium, or hafnium atom; and $R^2$, $R^3$, $R^4$, and $R^5$ are independently a hydrogen atom, a halogen atom, a hydrocarbon, an alkoxy, or an aryloxy group of 1 to 12 carbon atoms,

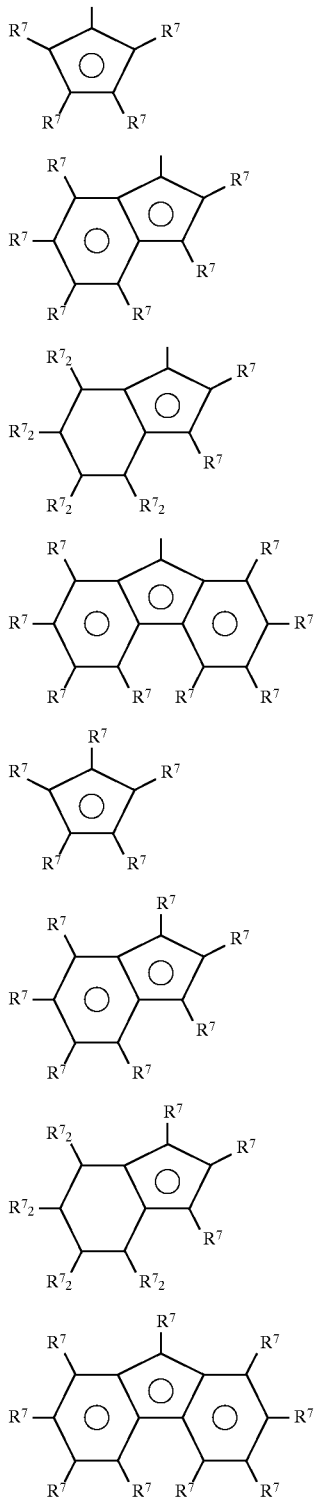

(4)

(5)

(6)

(7)

(8)

(9)

(10)

(11)

where each $R^7$ is independently a hydrogen atom, a halogen atom, a hydrocarbon, an alkoxy, or an aryloxy group of 1 to 12 carbon atoms.

The ionizing ionic compound (b) includes protonic acids represented by General Formula (12):

$$[HL^1{}_l][M^1Z^1{}_4] \qquad (12)$$

where H is proton; each l is independently a Lewis base; l is a number in a range of 0<l<2; $M^1$ is a boron, aluminum, or gallium atom; each $Z^1$ is independently an alkyl or alkoxy group of 1 to 20 carbons, an aryloxy, aryl, alkylaryl, or arylalkyl group of 6 to 20 carbons, a halogen-substituted hydrocarbon or halogen-substituted alkoxy group of 1 to 20 carbons, a halogen-substituted aryloxy group of 6 to 20 carbons, or a halogen atom, Lewis acids represented by General Formula (13):

$$[C][M^2Z^2{}_4] \qquad (13)$$

where C is a carbonium or tropylium cation; $M^2$ is a boron, aluminum, or gallium atom; each Z is independently an alkyl or alkyloxy group of 1 to 20 carbons, an aryloxy, aryl, alkylaryl, or arylalkyl group of 6 to 20 carbons, a halogen-substituted hydrocarbon or halogen-substituted alkoxy group of 1 to 20 carbons, a halogen-substituted aryloxy group or 6 to 20 carbons, or a halogen atom, or metal salts represented by General Formula (14):

$$[M^3L^2{}_p][M2Z^3{}_4] \qquad (14)$$

where $M^3$ is a cation of a metal selected from metals of 1, 2, 8, 9, 10, 11, and 12 Groups of Periodic Table; $M^2$ is a boron, aluminum, or gallium atom; each Z is independently an alkyl or alkyloxy group of 1 to 20 carbons, an aryloxy, aryl, alkylaryl or arylalkyl group of 6 to 20 carbons, a halogen-substituted hydrocarbon or halogen-substituted alkoxy group of 1 to 20 carbons, a halogen-substituted aryloxy group of 6 to 20 carbons, or a halogen atom, and $L^2$ is a Lewis base or a cyclopentadienyl derivative represented by General Formula (15), and p is a number in a range of 0<p<2:

(15)

where each $R^8$ is independently a halogen atom, a hydrocarbon, an alkoxy, or an aryloxy group of 1 to 20 carbons.

The ionizing ionic compound (b) is exemplified by:

tri(n-butyl)ammonium tetrakis(p-tolyl)borate,
tri(n-butyl)ammonium tetrakis(m-tolyl)borate,
tri(n-butyl)ammonium tetrakis(2,4-dimethyl)borate,
tri(n-butyl)ammonium tetrakis(3,5-dimethylphenyl)borate,
tri(n-butyl)ammonium tetrakis(pentafluorophenyl)borate,
N,N-dimethylanilinium tetrakis(p-tolyl)borate,
N,N-dimethylanilinium tetrakis(m-tolyl)borate,
N,N-dimethylanilinium tetrakis(2,4-dimethylphenyl)borate,
N,N-dimethylanilinium tetrakis(3,5-dimethylphenyl)borate,
N,N-dimethylanilinium tetrakis(pentafluorophenyl)borate,
triphenylcarbenium tetrakis(p-tolyl)borate,
triphenylcarbenium tetrakis(m-tolyl)borate,
triphenylcarbenium tetrakis(2,4-dimethylphenyl)borate,
triphenylcarbenium tetrakis(3,5-dimethylphenyl)borate,
triphenylcarbenium tetrakis(pentafluorophenyl)borate,
tropylium tetrakis(p-tolyl)borate,
tropylium tetrakis(m-tolyl)borate,
tropylium tetrakis(2,4-dimethylphenyl)borate,
tropylium tetrakis(3,5-dimethylphenyl)borate,
tropylium tetrakis(pentafluorophenyl)borate,
lithium tetrakis(pentafluorophenyl)borate,
lithium tetrakis(phenyl)borate,
lithium tetrakis(p-tolyl)borate,
lithium tetrakis(m-tolyl)borate, lithium tetrakis(2,4-dimethylphenyl)borate,
lithium tetrakis(3,5-dimethylphenyl)borate,
lithium tetrafluoroborate,
sodium tetrakis(pentafluorophenyl)borate,
sodium tetrakis(phenyl)borate,
sodium tetrakis(p-tolyl)borate,
sodium tetrakis(m-tolyl)borate,
sodium tetrakis(2,4-dimethylphenyl)borate,
sodium tetrakis(3,5-dimethylphenyl)borate,
sodium tetrafluoroborate,
potassium tetrakis(pentafluorophenyl)borate,
potassium tetrakis(phenyl)borate,
potassium tetrakis(p-tolyl)borate,
potassium tetrakis(m-tolyl)borate,
potassium tetrakis(2,4-dimethylphenyl)borate,
potassium tetrakis(3,5-dimethylphenyl)borate,
potassium tetrafluoroborate,
tri(n-butyl)ammonium tetrakis(p-tolyl)aluminate,
tri(n-butyl)ammonium tetrakis(m-tolyl)aluminate,
tri(n-butyl)ammonium tetrakis(2,4-dimethyl)aluminate,
tri(n-butyl)ammonium tetrakis(3,5-dimethylphenyl) aluminate,
tri(n-butyl)ammonium tetrakis(pentafluorophenyl) aluminate,
N,N-dimethylanilinium tetrakis(p-tolyl)aluminate,
N-N-dimethylanilinium tetrakis(m-tolyl)aluminate,
N,N-dimethylanilinium tetrakis(2,4-dimethylphenyl) aluminate,
N,N-dimethylanilinium tetrakis(3,5-dimethylphenyl) aluminate,
N-N-dimethylanilinium tetrakis(pentafluorophenyl)aluminate,
triphenylcarbenium tetrakis(p-tolyl)aluminate,
triphenylcarbenium tetrakis(m-tolyl)aluminate,
triphenylcarbenium tetrakis(2,4-dimethylphenyl)aluminate,
triphenylcarbenium tetrakis(3,5-dimethylphenyl)aluminate,
triphenylcarbenium tetrakis(pentafluorophenyl)aluminate,
tropylium tetrakis(p-tolyl)aluminate,
tropylium tetrakis(m-tolyl)aluminate,
tropylium tetrakis(2,4-dimethylphenyl)aluminate,
tropylium tetrakis(3,5-dimethylphenyl)aluminate,
tropylium tetrakis(pentafluorophenyl)aluminate,
lithium tetrakis(pentafluorophenyl)aluminate,
lithium tetrakis(phenyl)aluminate,
lithium tetrakis(p-tolyl)aluminate,
lithium tetrakis(m-tolyl)aluminate,
lithium tetrakis(2,4-dimethylphenyl)aluminate,
lithium tetrakis(3,5-dimethylphenyl)aluminate,
lithium tetrafluoroaluminate,
sodium tetrakis(pentafluorophenyl)aluminate,
sodium tetrakis(phenyl)aluminate,
sodium tetrakis(p-tolyl)aluminate,
sodium tetrakis(m-tolyl)aluminate,
sodium tetrakis(2,4-dimethylphenyl)aluminate,
sodium tetrakis(3,5-dimethylphenyl)aluminate,
sodium tetrafluoroaluminate,
potassium tetrakis(pentafluorophenyl)aluminate,
potassium tetrakis(phenyl)aluminate,
potassium tetrakis(p-tolyl)aluminate,
potassium tetrakis(m-tolyl)aluminate,
potassium tetrakis(2,4-dimethylphenyl)aluminate,
potassium tetrakis(3,5-dimethylphenyl)aluminate,
potassium tetrafluoroaluminate,
However, the ionizing ionic compound is not limited thereto in the present invention.

The organic aluminum compound (c) employed in the present invention is a compound represented by General Formula (3), and exemplified specifically by trimethylaluminum, triethylaluminum, triisopropylaluminum, diisopropylaluminum chloride, isopropylaluminum dichloride, tributylaluminum, triisobutylaluminum, diisobutylaluminum chloride, isobutylaluminum dichloride, tri(t-butyl)aluminum, di(t-butyl) aluminum chloride, t-butylaluminum dichloride, triamylaluminum, diamylaluminum chloride, amylaluminum dichloride, and the like, but is not limited thereto.

The Lewis base compound (d) employed in the present invention is a compound capable of donating an electron to the formed cationic metallocene compound, and exemplified specifically by esters such as methyl formate, ethyl formate, butyl formate, isobutyl formate, pentyl formate, methyl acetate, ethyl acetate, propyl acetate, isopropyl acetate, butyl acetate, isobutyl acetate, pentyl acetate, isopentyl acetate, hexyl acetate, cyclohexyl acetate, benzyl acetate, 3-methoxybutyl acetate, 2-ethylbutyl acetate, 3-ethylhexylacetate, 3-methoxybutyl acetate, methyl propionate, ethyl propionate, butyl propionate, isopentyl propionate, methyl butyrate, ethyl butyrate, butyl butyrate, isopentyl butyrate, isobutyl isobutyrate, ethyl isovalerate, isobutyl isovalerate, butyl stearate, pentyl stearate, methyl benzoate, ethyl benzoate, propyl benzoate, butyl benzoate, isopentyl benzoate, benzyl benzoate, ethyl cinnamate, diethyl oxalate, dibutyl oxalate, dipentyl oxalate, diethyl malonate, dimethyl maleate, diethyl maleate, dibutyl maleate, dimethyl phthalate, diethyl phthalate, dibutyl phthalate, diisobutyl phthalate, and triacetin;

amines such as methylamine, dimethylamine, trimethylamine, ethylamine, diethylamine, triethylamine, propylamine, diisopropylamine, butylamine, isobutylamine, dibutylamine, tributylamine, pentylamine, dipentylamine, tripentylamine, 2-ethylhexylamine, allylamine, aniline, N-methylaniline, N,N-dimethylaniline, N,N-diethylaniline, toluidine, cyclohexylamine, dicyclohexylamine, pyrrole, piperidine, pyridine, picoline, 2,4-lutidine, 2,6-lutidine, 2,6-di(t-butyl) pyridine, quinoline, and isoquinoline;

ethers such as diethyl ether, dipropyl ether, diisopropyl ether, dibutyl ether, dihexyl ether, anisole, phenetole, butyl phenyl ether, methoxytoluene, benzyl ethyl ether, diphenyl ether, dibenzyl ether, veratrole, 2-epoxypropane, dioxane, trioxane, furan, 2,5-dimethylfuran, tetrahydrofuran, tetrahydropyrane, 1,2-diethoxyethane, 1,2-dibutoxyethane, and crown ethers;

ketones such as acetone, methyl ethyl ketone, methy propyl ketone, diethyl ketone, butyl methyl ketone, methyl isobutyl ketone, methyl pentyl ketone, dipropyl ketone, diisobutyl ketone, cyclohexanone, methylcyclohexanone, and acetophenone;

thioethers such as dimethyl sulfide, diethyl sulfide, thiophene, and tetrahydrothiophene;

silyl ethers such as tetramethoxysilane, tetraethoxysilane, tetra(n-propoxy)silane, tetra(isopropoxy)silane, tetra(n-butoxy)silane, tetra(isopentoxy)silane, tetra(n-hexoxy) silane, tetraphenoxysilane, tetrakis(2-ethylhexoxy)silane, tetrakis(2-ethylbutoxy)silane, tetrakis(2-methoxyethoxy) silane, methyltrimethoxysilane, ethyltrimethoxysilane, n-propyltrimethoxysilane, isopropyltrimethoxysilane, n-butyltrimethoxysilane, isobutyltrimethoxysilane, sec-butyltrimethoxysilane, t-butyltrimethoxysilane, phenyltrimethoxysilane, vinyltrimethoxysilane, norbornyltrimethoxysilane, cyclohexyltrimethoxysilane, chloromethyltrimethoxysilane, 3-chloropropyltrimethoxysilane, chlorotrimethoxysilane, triethoxysilane, methyltriethoxysilane, ethyltriethoxysilane, n-propyltriethoxysilane, n-butyltriethoxysilane, phenyltriethoxysilane, vinyltriethoxysilane, 3-aminopropyltriethoxysilane, ethyltri(isopropoxy)silane, isopentyl(n-butoxy)silane, methyl(tri-n-hexoxy)silane, methyldimethoxysilane, diemthyldimethoxysilane, n-propylmethyldimethoxysilane, n-propylethyldimethoxysilane, di(n-propyl) dimethoxysilane, isopropylmethyldimethoxysilane, di(isopropyl)dimethoxysilane, n-propylisopropyldimethoxysilane, n-butylmethyldimethoxysilane, n-butylethyldimethoxysilane, n-butyl-n-propyldimethoxysilane, n-butylisopropyldimethoxysilane, di(n-butyl) dimethoxysilane, isobutylmethyldimethoxysilane, diisobutyldimethoxysilane, sec-butylethyldimethoxysilane, di(sec-butyl) dimethoxysilane, t-butylmethyldimethoxysilane, t-butyl-n-propyldimethoxy-silane, di(t-butyl)dimethoxysilane, t-butyl-n-hexyldimethoxysilane, diisoamyldimethoxysilane, n-hexyl-n-propyldimethoxysilane, n-decylmethyldimethoxysilane, norbornylmethyldimethoxysilane, cyclohexylmethyldimethoxysilane, methylphenyldimethoxysilane, diphenyldimethoxysilane, dicyclopentyldimethoxysilne, dimethyldiethoxysilane, diethyldiethoxysilane, di(isopropyl)diethoxysilane, sec-butylmethyldiethoxysilane, t-butylmethyldiethoxysilane, dimethyl(n-butoxy)silane, trimethylmethoxysilane, trimethylethoxysilane, trimethylisopropoxysilane, trimethyl-n-propoxysilane, trimethyl-t-butoxysilane, trimethylisobutoxysilane, trimethyl-n-butoxysilane, trimethyl-n-pentoxysilane, and trimethylphenoxysilane;

phosphines such as methylphosphine, ethylphosphine, phenylphosphine, benzylphosphine, dimethylphosphine, diethylphosphine, diphenylphosphine, methylphenylphosphine, trimethylphosphine, triethylphosphine, triphenylphosphine, tri(n-butyl) phosphine, ethylbenzylphenylphosphine, ethylbenzylbutylphosphine, trimethoxyphosphine, and diethylethoxyphosphine;

phosphine oxides such as triphenylphosphie oxide, dimethylethoxyphosphie oxide, and triethoxyphosphine oxide;

nitriles such as acrylonitrile, cyclohexanedintirile, and benzonitrile;

nitro compounds such as nitrobenzene, nitrotoluene, and dinitrobenzene;

acetals such as acetone dimethylacetal, acetophenone dimethylacetal, benzophenone dimethylacetal, and cyclohexanone dimethylacetal;

carbonate esters such as diethyl carbonate, diphenyl carbonate, and ethylene carbonate;

thioacetals such as 1-ethoxy-1-(methylthio)cyclopentane, thioketones such as cyclohexanethione;

and the like, but the Lewis base compound is not limited thereto.

The α-olefin in the present invention includes specifically ethylene, propylene, 1-butene, 4-methyl-1- pentene, 1-hexene, 1-octene, and styrene, but is not limited thereto, and two or more thereof may be used in combination.

The catalyst may be prepared in the present invention by mixing the aforementioned components of a metallocene compound (a), an ionizing ionic compound (b), an organoaluminum compound (c) and a Lewis base compound (d), for example, in an inert solvent. The method of catalyst preparation is not limited thereto.

The ionizing ionic compound (b) is used in an amount of preferably not less than one mole per mole of the metallocene compound (a) in the present invention to obtain a desirable catalyst activity. Although the upper limit is not specified, the amount of the ionizing ionic compound to be used is preferably not more than 100 moles per mole of the metallocene compound in consideration of the ash content of the produced polymer, or not more than 30 moles per mole of the metallocene compound in consideration of the cost.

The organic aluminum compound (c) is used in an amount of preferably not less than 10 moles per mole of the metallocene compound (a) in terms of aluminum to obtain a desirable catalyst activity, and not more than 100000 moles to suppress the chain transfer causing lowering of molecular weight and not to increase the ash content, although the amount is not limited thereto.

The Lewis base compound (d) is used in an amount of preferably not less than 0.1 mole per mole of the metallocene compound (a) to stabilize the active species and to prevent loss of the catalyst activity and raise polymer productivity, and preferably not more than 1000 moles not to retard the polymerization reaction.

The process for the polymerization is not specially limited, and includes slurry processes, gas phase processes, bulk processes, solution processes, and high-temperature high-pressure processes. The temperature of the polymerization is not specially limited, but is preferably not lower than 0° C. to obtain high productivity, and not higher than 300° C. to suppress the chain transfer causing lowering of molecular weight and maintain the catalyst efficiency. The pressure of the polymerization is not specially limited, but is preferably atmospheric pressure or higher to obtain high productivity.

The present invention is described more specifically by reference to examples without limiting the invention thereto.

The procedures of polymerization, reaction, and solvent purification were conducted in an inert atmosphere. The solvent used in the reaction was purified, dried, and/or deoxygenated by conventional methods. The compounds used in the reactions were synthesized and identified by conventional methods.

EXAMPLE 1

In a 1-liter reactor, was placed 600 ml of an aliphatic hydrocarbon (IP Solvent 1620, produced by Idemitsu Petrochemical Co.). The temperature of the reactor was maintained at 150° C. Ethylene was fed to the reactor at a pressure of 20 kg/cm$^2$. Separately, a solution of 0.25 μmol of diphenylmethylene(cyclopentadienyl)(fluorenyl) zirconium dichloride in toluene was placed in another vessel, and thereto a solution of triisobutylaluminum in toluene (triisobutyl-aluminum: 20% by weight) was added in an amount of 62.5 μmol in terms of aluminum. The mixture was stirred for one hour. Then the mixture was added to a solution of 0.5 μmol of N,N-dimethylanilinium tetrakis(pentafluorophenyl)borate in toluene, and the mixture was stirred for 10 minutes. To this mixture, a solution of 2.5 μmol of diisobutyl phthalate in toluene was added, and the mixture was stirred for 10 minutes. The resulting mixture was introduced into the aforementioned reactor by nitrogen pressure. The reactor was maintained at 150° C. with stirring at a rate of 1500 rpm for one hour. The resulting reaction product was dried at 100° C. under vacuum for 6 hours to obtain an ethylene polymer. The result is shown in Table 1.

EXAMPLE 2

An ethylene polymer was obtained in the same manner as in Example 1 except that 12.5 μmol of diphenyldimethoxysilane was used in place of 2.5 μmol of the diisobutyl phthalate. The result is shown in Table 1.

COMPARATIVE EXAMPLE 1

An ethylene polymer was obtained in the same manner as in Example 1 except that 2.5 μmol of diisobutyl phthalate was not used. The result is shown in Table 1.

EXAMPLE 3

In a 1-liter reactor, was placed 600 ml of an aliphatic hydrocarbon (IP Solvent 1620, produced by Idemitsu Petrochemical Co.). The temperature of the reactor was maintained at 150° C. Ethylene was fed to the reactor at a pressure of 20 kg/cm². Separately, a solution of 1.0 μmol of ethylenebis(indenyl)zirconium dichloride in toluene was placed in another vessel, and thereto a solution of triisobutylaluminum (triisobutylaluminum: 20% by weight) was added in an amount of 250 μmol in terms of aluminum. The mixture was stirred for one hour. Then the mixture was added to a solution of 2 μmol of N,N-dimethylanilinium tetrakis(pentafluorophenyl)borate in toluene, and the mixture was stirred for 10 minutes. To this mixture, a solution of 50 μmol of diisobutyl phthalate in toluene was added, and the mixture was stirred for 10 minutes. The resulting mixture was introduced into the aforementioned reactor by nitrogen pressure. The reactor was maintained at 150° C. with stirring at a rate of 1500 rpm for one hour. The resulting reaction product was dried at 100° C. under vacuum for 6 hours to obtain an ethylene polymer. The result is shown in Table 1.

EXAMPLE 4

An ethylene polymer was obtained in the same manner as in Example 3 except that 10 μmol of diphenyldimethoxysilane was used in place of 50 μmol of the diisobutyl phthalate. The result is shown in Table 1.

EXAMPLE 5

An ethylene polymer was obtained in the same manner as in Example 3 except that 50 μmol of diphenyldimethoxysilane was used in place of 50 μmol of the diisobutyl phthalate. The result is shown in Table 1.

EXAMPLE 6

An ethylene polymer was obtained in the same manner as in Example 3 except that 250 μmol of diphenyldimethoxysilane was used in place of 50 μmol of the diisobutyl phthalate. The result is shown in Table 1.

Examples 7, 8 and 9 were conducted according to Example 1.

COMPARATIVE EXAMPLE 2

An ethylene polymer was obtained in the same manner as in Example 3 except that 50 μmol of diisobutyl phthalate was not used. The result is shown in Table 1.

Comparative Examples 3 and 4 were conducted according to comparative Example 2.

The ionic metallocene catalyst of the present invention, as described above exhibits excellent catalytic activity in polymerization of α-olefin, and enablesproduction of α-olefin polymer with high efficiency.

TABLE 1

| | Zr complex | Ionizing compound | Lewis base compound | LB/Zr | Yield (g) |
|---|---|---|---|---|---|
| Examples | | | | | |
| 1 | Ph$_2$C(Cp)(Flu)ZrCl$_2$ | B-1 | DIBP | 10 | 36 |
| 2 | Ph$_2$C(Cp)(Flu)ZrCl$_2$ | B-2 | DPDMS | 50 | 36 |
| 3 | Et(Ind)$_2$ZrCl$_2$ | | DIBP | 50 | 64 |
| 4 | Et(Ind)$_2$ZrCl$_2$ | | DPDMS | 10 | 46 |
| 5 | Et(Ind)$_2$ZrCl$_2$ | | DPDMS | 50 | 40 |
| 6 | Et(Ind)$_2$ZrCl$_2$ | | DPDMS | 250 | 48 |
| 7 | Ph$_2$C(Cp)(Flu)ZrCl$_2$ | B-2 | DIBP | 1.1 | 25 |
| 8 | Ph$_2$C(Cp)(Flu)ZrCl$_2$ | B-1 | DIBP | 0.1 | 21 |
| 9 | (Cp)$_2$ZrCl$_2$ | B-1 | DIBP | 10 | 20 |
| Comparative Examples | | | | | |
| 1 | Ph$_2$C(Cp) (Flu)ZrCl$_2$ | B-1 | — | — | 18 |
| 2 | Et(Ind)$_2$ZrCl$_2$ | — | — | — | 29 |
| 3 | Ph$_2$C(Cp) (Flu)ZrCl$_2$ | B-2 | — | — | 19 |
| 4 | (Cp)$_2$ZrCl$_2$ | B-1 | — | — | 15 |

B-1: Ph(Me)$_2$NH.B(C$_6$F$_4$)$_4$
B-2: Ph$_3$C.B(C$_6$F$_5$)$_4$
DIBP: Diisobutyl phthalate
DPDMS: Diphenyldimethoxysilane

What is claimed is:

1. A catalyst for polymerization of an olefin, comprising a) a metallocene compound, b) an ionizing ionic compound, c) an organoaluminum compound, and d) a Lewis base compound: the metallocene compound a) being represented by General Formula (1) or (2):

     (1)

     (2)

where Cp$^1$ and Cp$^2$ are independently a hydrocarbon group represented by General Formula (4), (5), (6), or (7) below; Cp$^3$ and Cp$^4$ are independently a hydrocarbon group represented by General Formula (8), (9), (10), or (11) below; R$^1$ is a substituted or unsubstituted alkylene, dialkylsilanediyl, dialkylgermandiyl, alkylphosphinediyl, or alkylimino group, and R$^1$ links Cp$^1$ with Cp$^2$ by bridging; M is a titanium, zirconium, or hafnium atom; and R$^2$, R$^3$, R$^4$, and R$^5$ are independently a hydrogen atom, a halogen atom, a hydrocarbon group, an alkoxy group, or an aryloxy group of 1 to 12 carbon atoms; wherein structures (4)–11 are:

     (4)

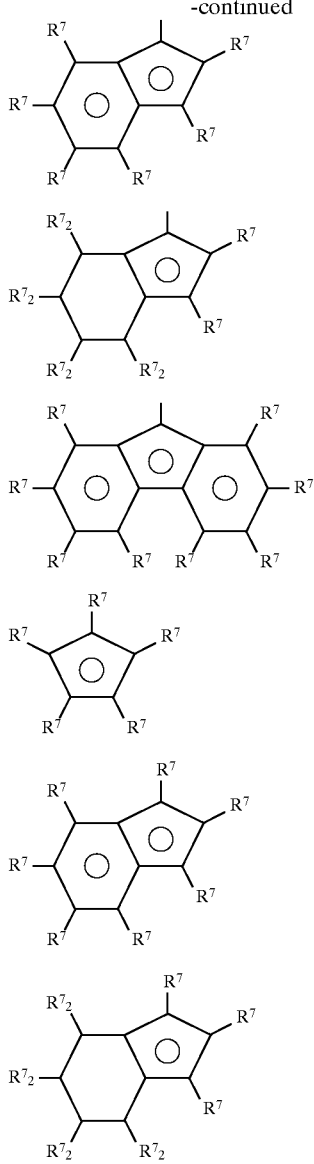

(5)

(6)

(7)

(8)

(9)

(10)

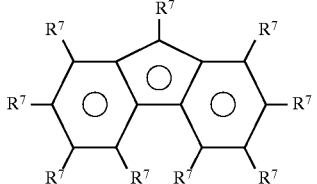

(11)

where each $R^7$ is independently a hydrocarbon atom, a halogen atom, a hydrocarbon, an alkoxy, or an aryloxy group of 1 to 12 carbon atoms; wherein the ionizing ionic compound b)is a compound which is capable of changing the above metallocene compound a)into a cationic metallocene compound and does not react further with the formed cationic metallocene compound; wherein the organoaluminum compound c)is represented by General Formula (3):

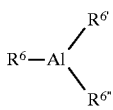

(3)

where $R^6$, $R^{6'}$, and $R^{6''}$ are independently a hydrogen atom, a halogen atom, an amino group, an alkyl group, an alkoxy group, or an aryl group, and at least one of $R^6$, $R^{6'}$, and $R^{6''}$ is an alkyl group; and wherein the Lewis base compound d)is capable of donating an electron to the formed cationic metallocene compound, said Lewis base compound being present in an amount which assures that the total of the amount of a Lewis base compound freed from the ionizing compound and the amount of a Lewis base compound to be added later is between 1.1 and 1,000 moles per mole of metallocene compound.

* * * * *

UNITED STATES PATENT AND TRADEMARK OFFICE
CERTIFICATE OF CORRECTION

PATENT NO. : 5,817,590
DATED : October 6, 1998
INVENTOR(S) : Saiki HASEGAWA, et al.

It is certified that error appears in the above-indentified patent and that said Letters Patent is hereby corrected as shown below:

On the title page, item [54] and on top of column one, the title should be:

--[54]  CATALYST FOR ALPHA -OLEFIN POLYMERIZATION CONTAINING A LEWIS BASE--

Signed and Sealed this

Eighth Day of June, 1999

*Attest:*

Q. TODD DICKINSON

*Attesting Officer*     Acting Commissioner of Patents and Trademarks